P. BERRY.
Guides for Setting Lumber.

No. 152,963. Patented July 14, 1874.

WITNESSES:

INVENTOR:
P. Berry
BY
ATTORNEYS.

UNITED STATES PATENT OFFICE.

PETER BERRY, OF MILLERSTOWN, OHIO.

IMPROVEMENT IN GUIDES FOR SETTING LUMBER.

Specification forming part of Letters Patent No. 152,963, dated July 14, 1874; application filed May 16, 1874.

*To all whom it may concern:*

Figure 1:
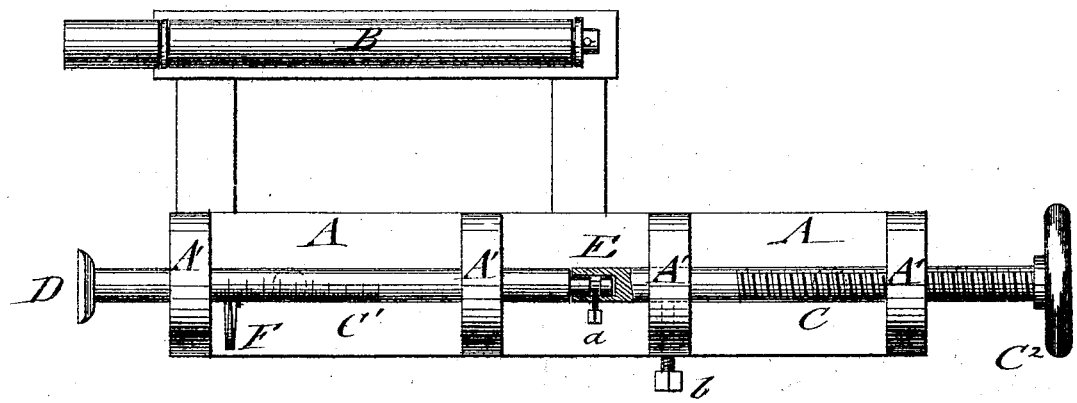
Figure 2:
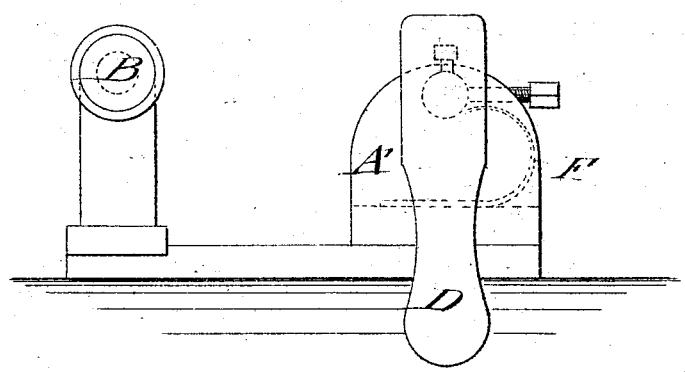

Be it known that I, PETER BERRY, of Millerstown, in the county of Champaign and State of Ohio, have invented a new and Improved Guide for Setting Lumber, of which the following is a specification:

In the accompanying drawings, Figure 1 represents a top view of my improved guide for setting lumber; Fig. 2, an end view of the same.

Similar letters of reference indicate corresponding parts.

The invention consists in an improved device for gaging the thickness of boards or other forms of lumber as cut from logs in the ordinary operation of sawing.

The frame A of the gage is designed to be bolted to the mill-frame, and thus be stationary near the saw and opposite the ways on which the log-carriage travels. The aligned screw-shaft C and graduated shaft $C^1$ are supported in vertical standards A' swiveled together at E, as shown. An index or pointer, F, is arranged opposite the graduated portion of shaft $C^1$ to indicate the degree of longitudinal adjustment of the same, which is effected by turning the screw-shaft by means of the hand-wheel $C^2$. A guide or head, D, is attached to the outer end of the shaft $C^1$, so as to hang vertical by its own gravity. The screw $b$ performs the office of a clamp for the screw-shaft to hold it in any adjustment.

The manner of using the device is as follows: A slab is first cut off from the log in the usual way, the head D turning up into a horizontal position as the log advances. The head is then adjusted toward the log beyond the plane of the saw to the extent of the thickness of board or other form of lumber to be cut from the log. Thereafter, each time a cut is made, the log is adjusted on the head-blocks till its straight side comes in contact with the head D, which thus acts as a stop or gage. When the log is being fed to the saw it moves in frictional contact with the head. The thickness of cut can be quickly and accurately varied by adjusting the shaft C in the bearings.

What I claim is—

In a device for gaging lumber, the combination of screw-shaft C and graduated shaft $C^1$ swiveled together, as shown, the index F, and head D, said parts being arranged on the frame A A', as described, to operate as specified.

PETER BERRY.

Witnesses:
WM. MARSHALL,
D. R. TAYLOR.